Fig. 1.

E. R. FELLOWS.
GEAR SHAPING MACHINE.
APPLICATION FILED MAY 1, 1908.

1,028,343.

Patented June 4, 1912.
10 SHEETS—SHEET 4.

Witnesses.
H. Brown
A. C. Ratigan

Inventor.
E. R. Fellows
by Wright, Brown,
Quinby & May Attys.

E. R. FELLOWS.
GEAR SHAPING MACHINE.
APPLICATION FILED MAY 1, 1908.

1,028,343.

Patented June 4, 1912.
10 SHEETS—SHEET 8.

Witnesses:
H. Brown
A. C. Ratigan

Inventor
E. R. Fellows
by Wright, Brown,
Quinby & May Attys.

E. R. FELLOWS.
GEAR SHAPING MACHINE.
APPLICATION FILED MAY 1, 1908.

1,028,343.

Patented June 4, 1912.
10 SHEETS—SHEET 9.

UNITED STATES PATENT OFFICE.

EDWIN R. FELLOWS, OF SPRINGFIELD, VERMONT, ASSIGNOR TO THE FELLOWS GEAR SHAPER COMPANY, OF SPRINGFIELD, VERMONT, A CORPORATION OF VERMONT.

GEAR-SHAPING MACHINE.

1,028,343.   Specification of Letters Patent.   Patented June 4, 1912.

Application filed May 1, 1908. Serial No. 430,392.

*To all whom it may concern:*

Be it known that I, EDWIN R. FELLOWS, of Springfield, in the county of Windsor and State of Vermont, have invented certain new and useful Improvements in Gear-Shaping Machines, of which the following is a specification.

This invention relates to machines for making spaced cuts upon metal blanks to form gears or racks. Its object is to provide a gear-cutting machine by which a gear or rack may be automatically completed by either a single series of cuts or by a double series, by which first roughing and subsequently finishing cuts are made.

Broadly the invention embraces the application to any gear or rack-cutting machine, of mechanism by which a cutter and blank are relatively moved so as first to produce a series of grooves of less depth than required to make a finished gear, and subsequently to make a series of finishing cuts in which the small amount of material left after the roughing cuts have been made is removed.

The invention further embraces the provision of a construction by which the gear may be made by a single series instead of two series of cuts.

In its preferred embodiment, which is the one herein illustrated and described, the invention is applied to a machine which generates the teeth upon blanks by means of a planing cutter having gear-shaped teeth, such as the machines illustrated and described in the patents granted to me March 30, 1897, and June 11, 1901, numbered 579,708 and 676,227, respectively. In its application to machines of this character the invention specifically includes mechanism for feeding the cutter and blank relatively to each other, to give the requisite depth to either the finishing or roughing cut, and then relatively moving the cutter and work laterally to cause the formation of a series of cuts around the latter. This mechanism includes automatic devices for disabling the depth feed when a sufficient depth for the roughing and finishing cuts has been secured, and automatically arresting the lateral feed when the final cut has been finished, such mechanism being illustrated in detail in the accompanying drawings.

Fig. 8 is a similar view showing the parts in a different position. Fig. 9 is a vertical central section of the mechanism shown in Fig. 8. Fig. 10 is a cross-section, taken on the line 10—10 of Fig. 9. Fig. 11 is a detail elevation of the feed-pawls. Fig. 11$^a$ is a detail view of a device for governing the throw of the timing pawl.

Like reference letters represent the same parts in all figures.

Referring to the drawings,—1 represents a supporting base on which is pivoted a work-carrier 2, having bearings rotatively holding a work-spindle 3, on which blanks 4 from which gears are to be made are placed and clamped.

5 is the cutter which is held in a saddle 6, and is reciprocated relatively to the blanks in the line of its axis, which is also parallel to the axis of the blank-holder.

Figure 1:
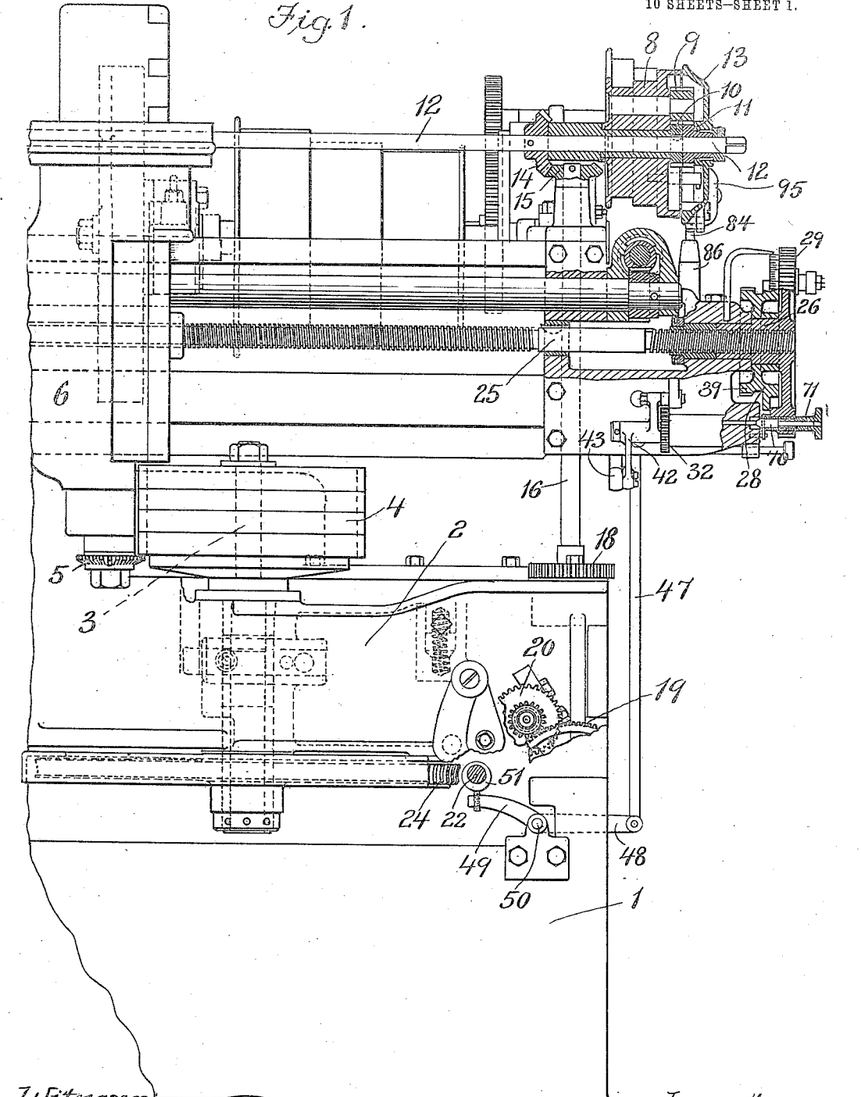
Figure 1 represents a vertical elevation, partly in section, of the machine.
Figure 2:
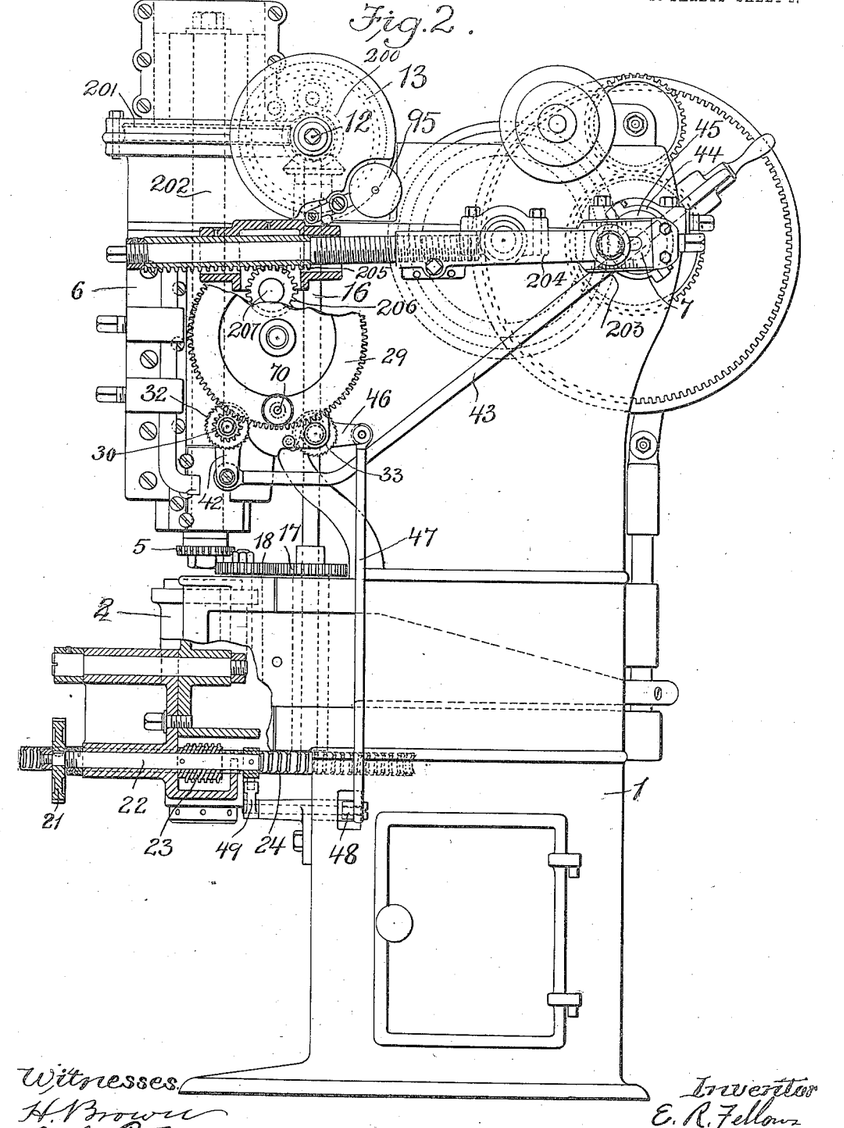
Fig. 2 represents an end elevation, as seen from the right, of Fig. 1, showing parts of the mechanism in section.
Figure 3:
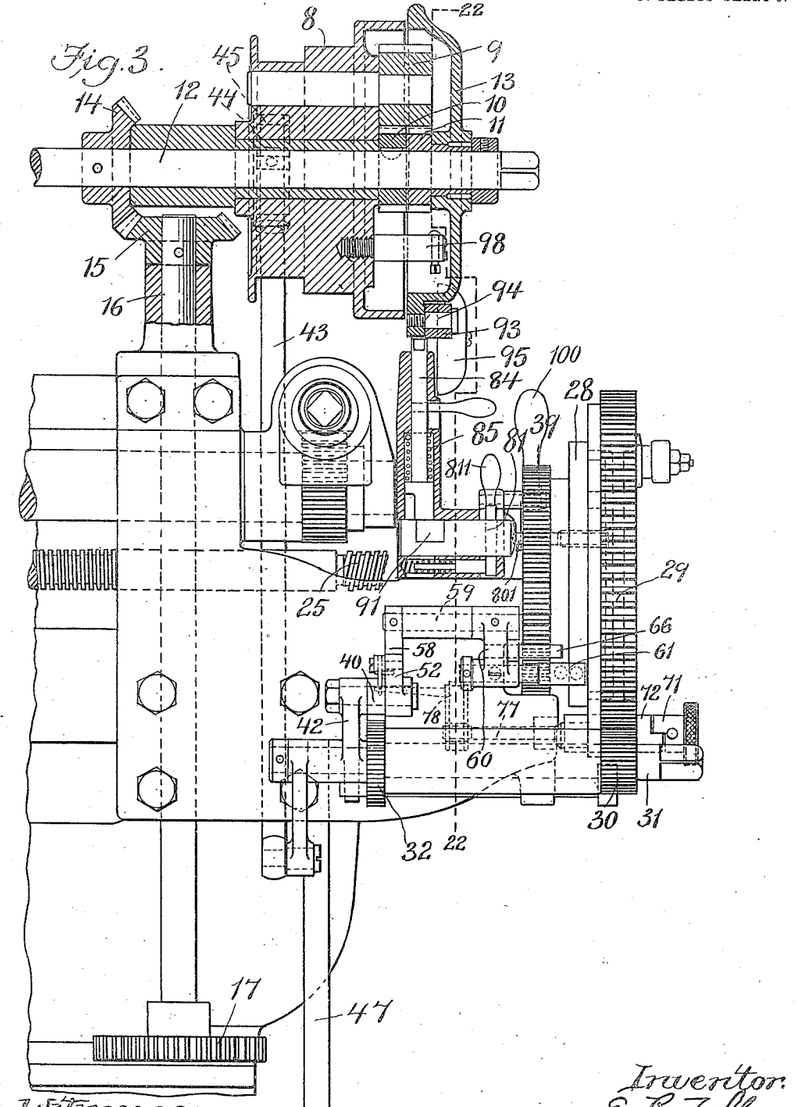
Fig. 3 represents a front elevation, on an enlarged scale, of the bracket carrying the principal parts of the feed mechanism.
Figure 4:
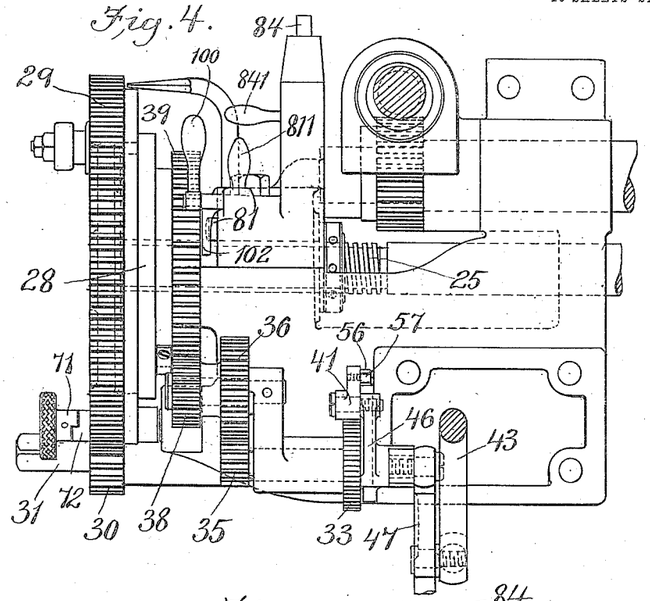
Figs. 4 and 5 represent, respectively, a rear elevation and an end elevation, as seen from the right of Fig. 3, of the same bracket.

7 represents a drive-shaft, from which motion is communicated by belt to a cone-pulley 8, carrying a planetary gear 9 in mesh with two gears 10 and 11, respectively, of which the former is keyed to shaft 12 and the latter is loose upon the shaft and fixed to a disk 13. Shaft 12 acts to rotate the cutter and, by means of beveled gears 14 15, a shaft 16. This shaft is connected through gears 17 18 and change gears 19 20 21 with a shaft 22, carrying a worm 23 which acts upon the index worm-wheel 24 of the work-spindle. The cutter is rotated in unison with the work spindle by means of a worm 200 (see Fig. 2) on the shaft 12 actuating a worm wheel 201 secured to the cutter spindle 202. Reciprocating movements are given to the cutter from the drive shaft 7 through a crank 203 on the latter, an extensible rod 204 pivoted to the crank and carrying a rack bar 205, and a pinion 206 meshing with said rack bar and mounted on a rock shaft 207 which has a gear connection with the slide in which the cutter spindle is journaled this mechanism being substantially the same as the corresponding construction illustrated in my Patent No. 676,227, to which reference may be had for a complete explanation thereof.

25 represents the depth feed screw and 26 the nut which operates the same, being constructed substantially as described in the patent aforesaid, and operating to feed the cutter radially toward the work-spindle to produce a cut of the necessary depth in the work.

The elements for effecting the objects of the present invention consist of the mechanism for operating the depth feed nut, a timing disk 28, means for rotating the same, and the mechanism by which at the proper time the nut-operating mechanism and timing disk operating mechanism are simultaneously connected and disconnected respectively. The depth feed nut is integrally connected with a gear 29, with which meshes a pinion 30 upon the same shaft 31 with a ratchet-wheel 32 which may conveniently be called the depth feed ratchet, while the timing disk is operated by a similar ratchet 33 which may be called the timing ratchet. The latter is connected, through a shaft 34 and pinions 35 and 36, with a shaft 37 carrying a pinion 38 in mesh with a gear 39, which is either integral with or rigidly connected to the timing disk 28. Pawls 40 41 are mounted adjacent the ratchets 32 and 33, respectively, and are carried by oscillating pawl-carriers, the first-named pawl being mounted upon a carrier 42, which is connected by means of the rod 43 with an eccentric strap 44 surrounding an eccentric 45 on the drive-shaft 7. As will be readily seen, each rotation of the shaft gives the pawl one impulse, and, when the latter is in operative engagement with the depth feed ratchet, moves the ratchet slightly and turns the feed nut 26 by the described mechanism, thus moving the cutter a short distance over toward the work-spindle. The pawl-carrier 46, upon which the other pawl 41 is pivoted, has a connection consisting of link 47 and lever-arms 48 49, mounted upon a rock-shaft 50, with a cam 51 upon the worm-shaft 22. Thereby the worm shaft not only engages the index wheel 24 and gives the blank its rotary feed, but also actuates the timing ratchet pawl.

It is essential that only one of the pawls above described should be in operation at the same time, and, accordingly, there is provided a connection for moving one out of engagement with its ratchet when the other is placed in operative relation with its respective ratchet. This mechanism consists of a gear-segment 52, rotatably mounted upon the pivot 53 of pawl 40, and having a pin 54 which is adapted to engage a pin 55, projecting from the pawl, when the gear-segment is turned toward the left, and thereby elevate the toe of the pawl so that it cannot engage the teeth of ratchet 32. A link 56 is pivoted at one end to the gear-segment and at its other end has a notch or slot into which projects a stud 57 mounted upon the timing pawl 41. When the segment 52 is rotated toward the right, the link is caused to bear upon stud 57 and elevate the toe of pawl 41 out of engagement with its ratchet, pawl 40 being then free to drop into engagement with ratchet 32. And when the segment is turned in the opposite direction to disconnect pawl 40, pawl 41 is free to drop into engagement with ratchet 33. For actuating segment 52 there is provided a coöperating gear-segment 58 mounted upon a rock-shaft 59, the other end of which carries an arm 60, having a projection 61, which is normally held in engagement with the periphery of the timing disk 28 by means of a weight 62 connected to segment 52.

Figure 6:
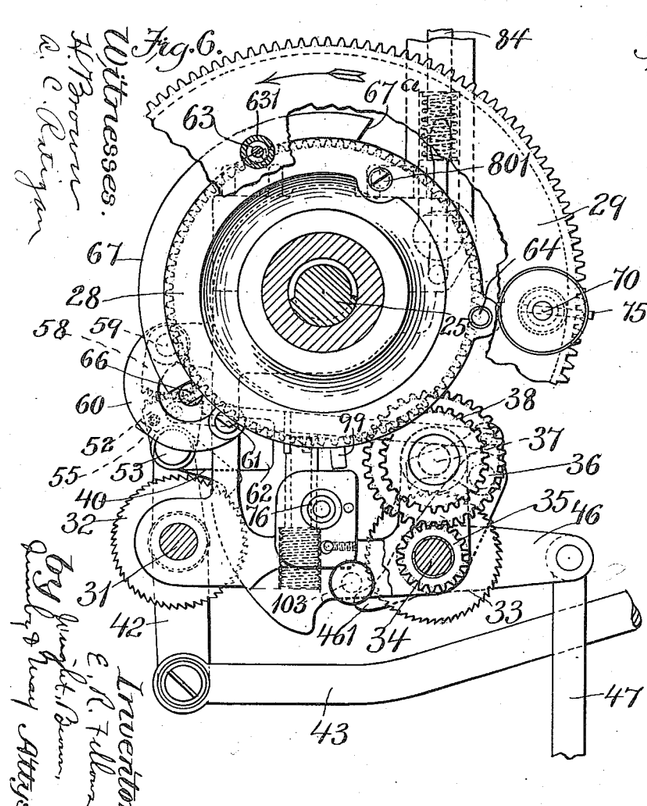
Figs. 6 and 7 are views similar to Fig. 5, but with parts broken away to show details of the feed mechanism.
Figure 7:
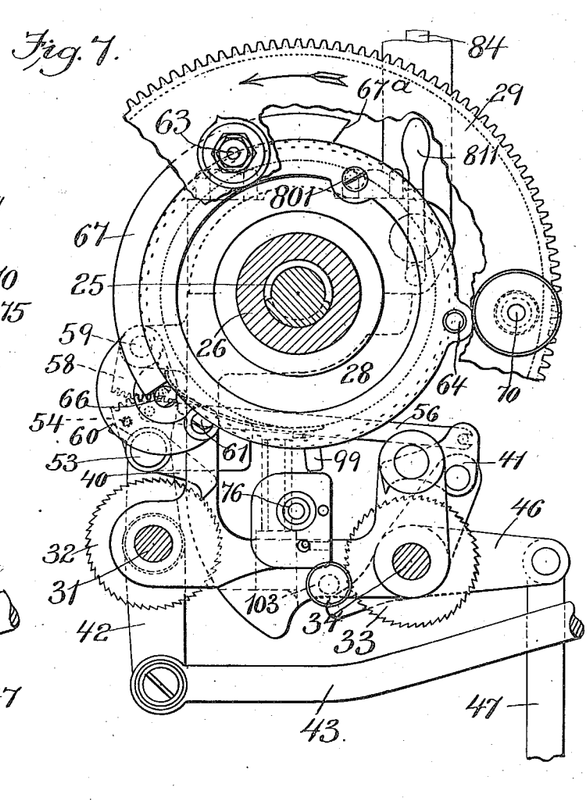

When a blank is to be cut, and before the operation has actually been commenced, the timing disk, depth feed mechanism and actuators therefor are in the position shown in Figs. 6 and 7, pin 61 being close to the rim of the timing disk, and the timing pawl being thereby held out of operative position, while the depth feed pawl is in position to engage its ratchet. Upon the machine being set in operation, the depth feed pawl is oscillated, and ratchet 32 moved step-by-step to turn the feed nut and move the cutter toward the work. When the gear 29 on the being thereby held out of operative position, shown in Fig. 8, a spring-pin 63 upon the gear has engaged a dog 64 on the timing disk and turned the latter a slight amount. This amount of movement is sufficient to release the end of a spring 65 carried by the timing disk, and which was previously held close to the face of the disk by a pin 66 mounted upon that part of the frame which supports the rock-shaft 59 and projecting beside the disk near the pin 61. Upon its release, the end of the spring flies outwardly and engages the pin 61, moving arm 60 and gear-segment 52 to the left, disconnecting the depth feed pawl and allowing the timing pawl to become operative. Thereupon, the depth feed ceases and the cutter is caused to continue its reciprocations in the same location, while the rotary or index feed operates, turning the cutter and the blank in unison. Through the timing pawl this movement is communicated to the disk 28, and a cam projection, or rib, 67 upon the latter engages the projection 61 and holds the same away from the disk. By the time the rotary feed mechanism has given the blank a complete rotation, the end 67$^a$ of the cam-rib has passed pin 61, and the latter has been allowed to move against the face of the disk, whereupon the timing pawl is thrown out of engagement and the depth feed pawl again rendered operative, the parts being then in the position illustrated in Fig. 12.

The operation thus far has resulted in roughing out the gear-blank, the teeth of which are now of somewhat larger dimensions than is required in the finished gear, for the dog 64 is so positioned as to be engaged and the depth feed disconnected before the cutter has been fed sufficiently far into the work to form the teeth completely. Upon the depth feed actuator being set in operation the second time, in the manner described, the cutter is fed still farther into the work to take the finishing cut, and when this cut has been made sufficiently deep, the feed is again stopped by the following mechanism.

Figures 12, 15:
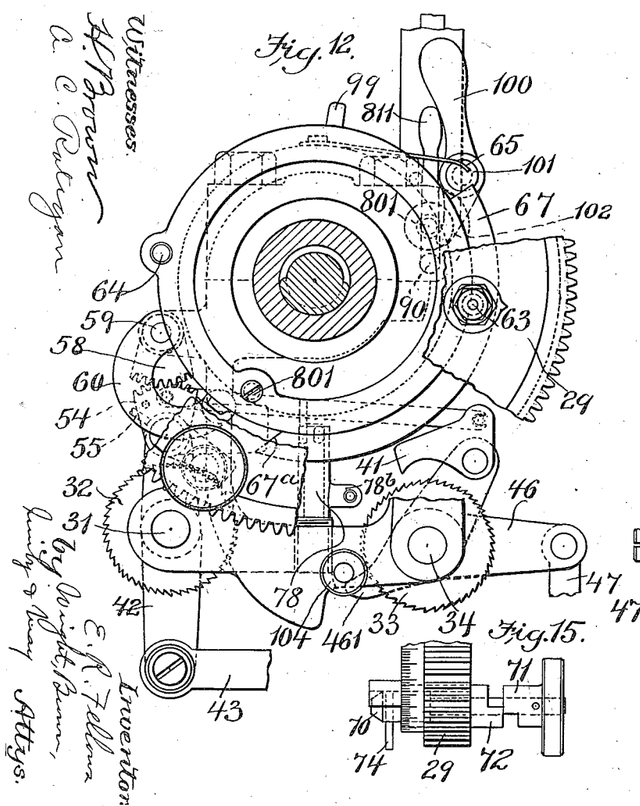
Fig. 12 is a view similar to Fig. 8, showing the mechanism in the position it occupies at the end of the roughing cut.
Figs. 14 and 15 are, respectively, a detail section and elevation of the locking pin and clutch for the depth feed nut.
Figures 13, 14:
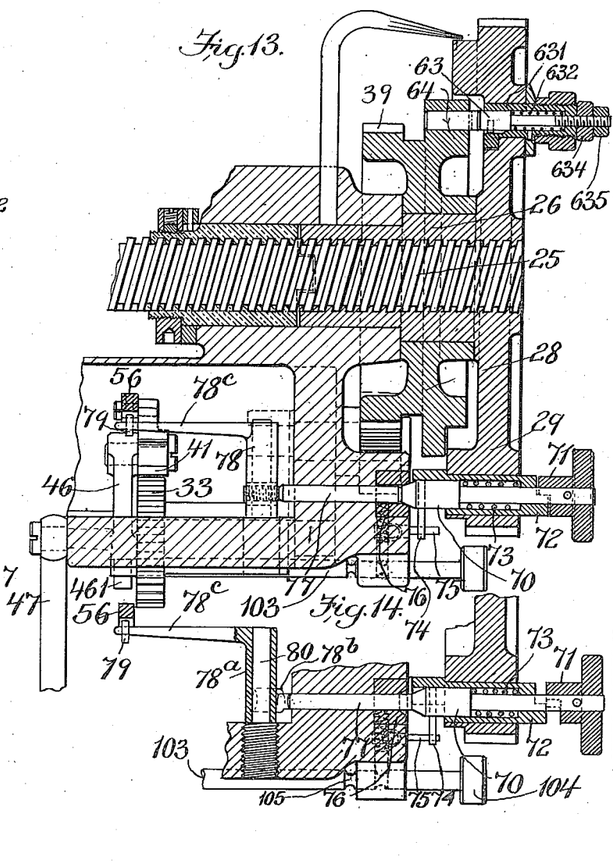
Fig. 13 is a vertical axial section of the parts shown in Fig. 12, in a different position.

70 is a pin carried by the feed-nut gear 29 having a clutch-member 71 which engages the complemental clutch-member 72 when it is pulled outward and turned a slight amount, being held in engagement therewith by a spring 73, as shown in Figs. 13, 14 and 15,—this construction being the same as that described in my patent, No. 676,227, referred to. The pin 74, carried by the locking-pin 70 engages a pin 75 mounted upon the frame, when the locking pin 70 has come opposite the socket in a bushing 76. Thereby the clutch-members are rotated and the locking-pin caused to slip into the socket under the action of spring 73. This not only locks the gear 29 and feed-nut 26 against further rotation, but it also causes the pawls to be again shifted through the agency of a pin 77, longitudinally movable in the frame and projecting through the bushing 76, and a bell-crank lever 78 which is engaged by the pin and one arm of which is caused to strike a pin or stud 79 projecting from the link 56, which connects the pawls. As will be seen, the bell-crank lever consists of a long, hollow sleeve 78$^a$ pivoted upon a pin 80 and having an arm 78$^b$ in position to be struck by the pin 77, and a second arm 78$^c$ which is the one that strikes pin 79. The parts are so arranged that when the locking-bolt 70 is slipped into its socket, the link 56 is moved so as to throw out pawl 40 and connect pawl 41. This causes the timing disk to be again set in operation and the rotary feed to be continued until the finishing cut has been taken entirely about the gear-blank. When this has been done and the blank has finished its second complete rotation, a pin 80$^1$ upon the timing disk contacts with the rounded end of a plunger 81 and forces the plunger inward. This plunger has a shoulder 82 which normally is located under the end 83 of the pin 84 and holds the latter elevated so that it is engaged with a portion of the disk 13, which is connected to the loose gear 11, whereby the loose gear and disk are held stationary and rotation is given the shaft 12 in the manner described in my previous patent. The spring 85 surrounds the pin 84, being located in a socket 86, and bears against an internal shoulder 87 of the socket and an external shoulder 88 of the pin, tending continually to lower the latter and release it from engagement with the disk. This tendency is resisted by the projection 82 of plunger 81, which plunger is held outward by a spring 89 which bears against the plunger 90 connected to plunger 81. When, however, the pin 80$^1$ carried by the timing disk, forces plunger 81 inward, the projection 82 of the latter is moved from under the pin 84 and the end 83 thereof is free to slip into a notch 91 of the plunger, and thereby pin 84 is disengaged from the disk.

The part of the disk which is engaged by the pin 84 is a stud 92 projecting from a lever 93, pivoted at 94 to the disk and carrying upon its other arm a bell 95. The pressure produced upon disk 13 by the pulley 8 and planetary gear 9 causes stud 92 to bear against the inclined end 96 of pin 84 and to be forced toward the periphery of the disk, compressing a spring 97 mounted in a socket 97$^a$ in lever 93. Upon pin 84 being depressed, the lever 93 is released and spring 97 moves it so as to carry the bell into the path of a striker 98, carried by the pulley, which upon every revolution of the pulley strikes the bell and gives warning to the operator that the blank upon the machine has been completed.

Figure 16:
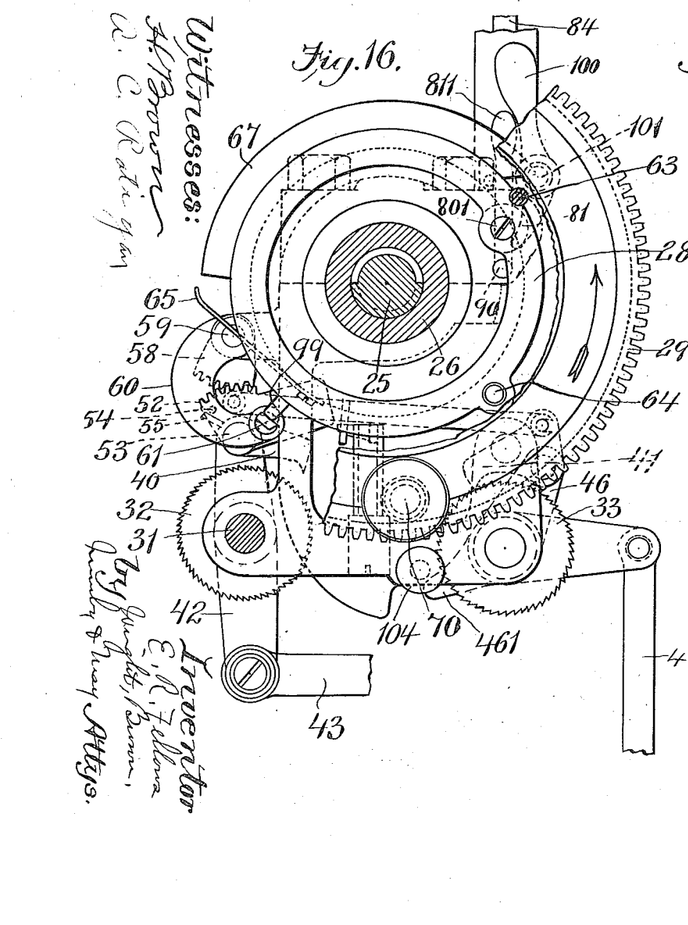
Fig. 16 is a view similar to Fig. 12, showing the parts in the position they occupy upon the completion of the gear.
Figure 17:
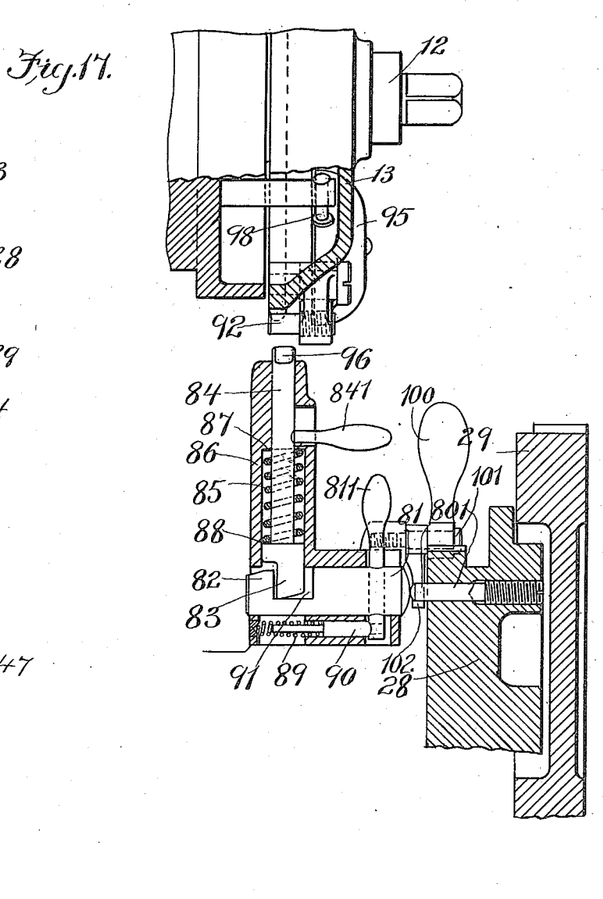
Fig. 17 is a vertical section of the mechanism which causes operation and disconnection of the rotary feed.
Figure 18:
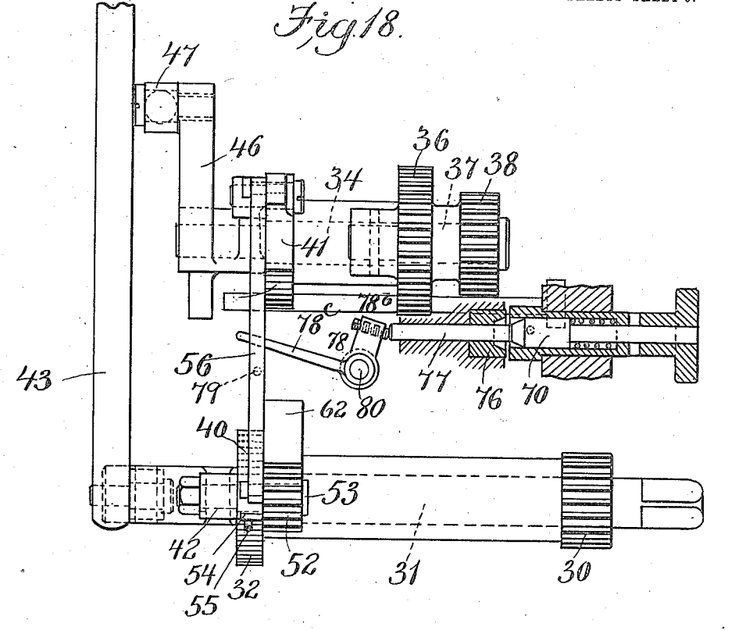
Fig. 18 is a diagrammatic plan view of a portion of the mechanism.

When the operation of cutting the teeth is entirely completed, the parts occupy the position shown in Figs. 16 and 17, pin 61 of the pawl governor being then engaged by a stud 99 of the timing disk and held away from the periphery thereof so that the depth feed will remain inoperative. This enables the locking bolt 70 to be retracted, and the feed nut 26 to be set by hand to permit a new blank to be inserted. The pin 84 is also depressed whereby disk 13 is allowed to rotate so that friction of the shaft 12 and the parts associated therewith prevents the indexing feed of the cutter and blank holder from taking place. In order to start the machine, the locking bolt 70 is disengaged from its socket, the feed nut set in proper position, and the timing disk 28 turned by the starting lever 100 a sufficient distance to disengage projection 99 from pin 61. The starting lever 100 is pivoted on a stud 101 near the plunger 81, and has an arm 102 projecting adjacent pin 801. When the handle portion of the starting lever is grasped and moved to the right, the arm 102 acts upon pin 801 to move the timing disk by the required amount, whereupon the pawl controlling pin 61 is released and weight 62 allowed to drop, connecting the depth feed pawl and disconnecting the timing pawl in the manner already described. The depth feed thereupon is started. Upon raising pin 84 by means of a handle 841, the plunger 81 is released and allowed to slip forward under the influence of spring 89, or to be moved manually by a handle 811. Pin 84 is therefore held elevated so that it will engage stud 92 and arrest disk 13, whereupon the rotary indexing feed will commence.

In order to enable a gear to be made with a single cut instead of by two distinct cuts hereinbefore described, I provide means whereby the spring pin 63 may be caused to pass by the dog 64 without engaging it. By reference to Fig. 13, it will be seen that this pin is mounted in a bushing 631 from which it is normally projected by a spring 632 surrounding its shank. The end of the shank projects from the bushing and is threaded, having mounted thereon an adjusting nut 634 and a lock nut 635. By adjusting these nuts, the pin can be retracted against the spring sufficiently far into the bushing so that it may pass by the end of dog 64. When the pin is thus retracted, the depth feed nut and gear will rotate without any interruption until the locking bolt 70 arrives at and slips into its socket 76, but by that time the complete depth feed is made. The timing disk is then set in operation, and when the pin 801 comes adjacent plunger 81, the blank has been completely rotated, and the rotary or indexing feed is stopped.

In order to enable the blank to make two complete revolutions when two cuts are taken, and to make only a single revolution when the gear is finished in a single cut, it is necessary to provide for driving the timing disk at different speeds under these conditions. This is done by giving the timing disk pawl a variable range of movement. As shown in the drawings, the proportions of the cam 51, levers 48 and 49, and pawl carrier 46 are such that the pawl 41 is carried, when not arrested, a distance sufficient to turn the timing ratchet through the angular distance of three teeth, this being the amount required to carry the timing disk from the starting position of Fig. 6, to the final position of Fig. 16, while the work holder is being rotated once.

Figures 8, 9, 10, 11, 11A:
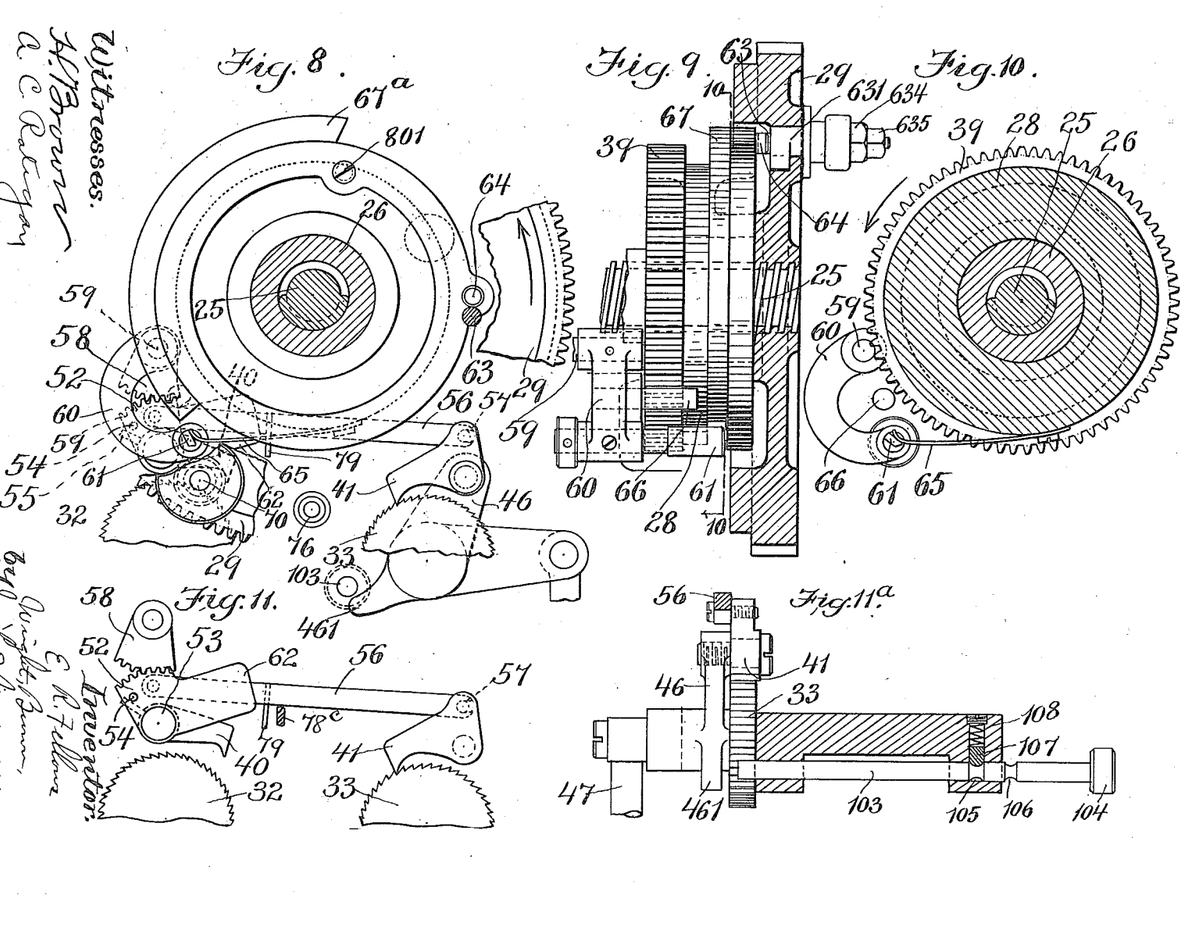

The pawl carrier 46 is provided with a lug 461 which oscillates adjacent to the end of a pin 103. This pin, as shown in Fig. 11$^a$, has an operating handle 104, and two grooves 105 106 with which a locking detent 107 is adapted to coöperate. When the detent is in groove 105, the end of pin 103 is retracted so that the lug 461 of the timing pawl carrier may pass by without engaging it. Upon pushing the pin inward so that the groove 106 is engaged by the detent, however, the end of the pin then projects into the path of lug 461 and arrests it after the timing pawl has been retracted only by the space of one tooth on the ratchet 33. Thus, at each rotation of the cam 51, the ratchet 33 is rotated only one tooth instead of three, so that two complete rotations of the work holder must be completed before the timing disk is turned far enough to stop the machine. As there is no positive mechanism for retracting the timing pawl, the stop pin 103 is enabled to limit such retraction without danger of injury to any of the parts. The detent 107 is rounded and pushed against pin 103 by a spring 108, being thereby enabled to yield and permit the pin to be adjusted when necessary, while preventing accidental displacement thereof.

Figure 5:
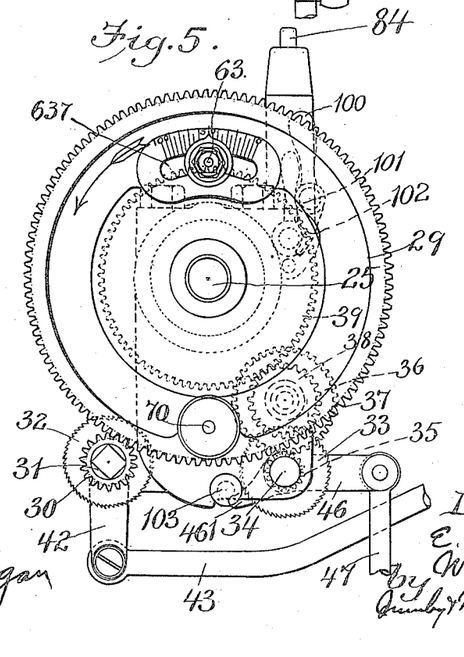

When the gear is to be made by a single cut, the pin 103 is retracted, as shown in Fig. 11$^a$, but when two cuts are to be made, it is pushed inward so as to interrupt the motion of pawl carrier 46. Provision is made for adjusting the pin 63 in order to enable a fine regulation for the depth feed to be had by causing the cessation of this feed to occur at an earlier or later time. For this purpose, the pin 63 is contained in a slot 637 on the wheel 29 as shown in Fig. 5. It may be shifted to either side and clamped, its position being gaged by an index at the side of the slot. Thus the dog 64 may be engaged by the pin at an earlier or later time, according as the pin is moved one way or the other in the slot.

Figures 19, 20:
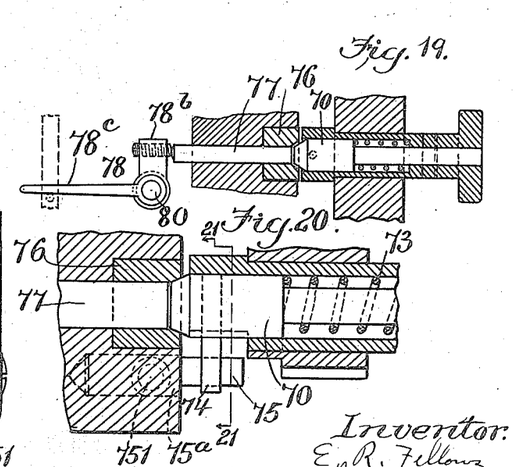
Fig. 19 is a sectional view showing the parts represented in Fig. 18, but in a different position.
Figs. 20 and 21 represent, respectively, axial and cross-sections of the locking pin for the depth feed nut.
Figure 21:
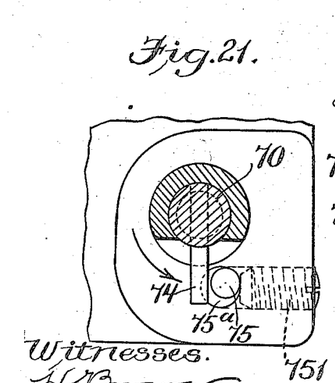
Figures 22, 23, 24:
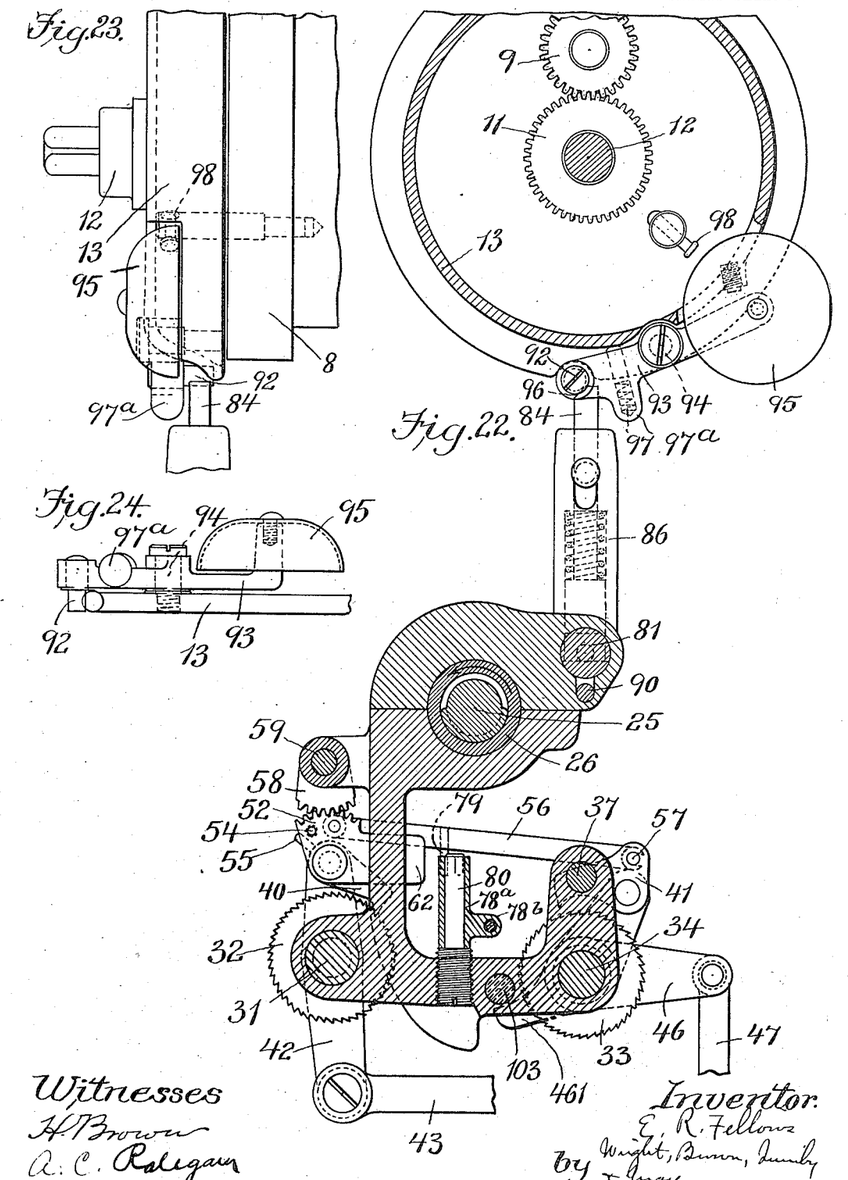
Fig. 22 represents a section on the line 22—22 of Fig. 3.
Fig. 23 represents a rear elevation of a warning-bell.
Fig. 24 an under plan view of the warning-bell.

Figs. 20 and 21 illustrate a contrivance for adjusting the pin 75 which causes the release of the feed-nut locking pin 70. As will be seen, the pin 75 is eccentrically mounted upon a stud 75$^a$ which is rotatable in a socket in the frame of the machine. By rotating the stud, pin 75 can be shifted a slight amount and the time at which it engages the projection 74 of locking pin 70 may be hastened or retarded. Thus the locking pin may be caused to project exactly at the moment when it comes opposite to its socket in the bushing 76. A screw 751 bears against stud 75ª and holds its locked in any adjusted position.

From the foregoing description it will be seen that I have provided a machine having the capability of making first a series of roughing cuts equi-distantly spaced about the work, thereby making grooves of less depth than required in the finished article, and subsequently, of making a series of finishing cuts to complete the grooves produced by the roughing cuts. The finishing cuts are comparatively slight and thereby accuracy and finish of workmanship is attained. The grooves produced by the cuts of course form the sides of adjacent teeth.

Instead of having two cuts as hereinbefore described, it is obvious that a plurality of roughing and finishing cuts each carried completely around the work may be made, and that mechanism whereby a result of this character may be secured is included within the scope of this invention.

What I claim is:

1. A gear generating machine adapted to form the teeth of a gear automatically in a plurality of series of cuts, comprising a work holder, a planing cutter having a series of gear-shaped teeth, mechanism for producing a relative axial movement between the cutter and work holder to cause the former to move across the face of the work, depth-feed mechanism for moving the cutter and work holder relatively together to cause the teeth of the former to progressively enter the work, indexing mechanism for producing a simultaneous lateral feed movement of the cutter and work holder at right angles to both the above-named movements, whereby the forms of gear teeth are generated in the work, a timing member, mechanism for operating said timing member, and means for simultaneously affecting the depth feed mechanism and timing member-operating mechanism to make one operative and the other inoperative, controlled at predetermined times by the depth mechanism and timing member respectively.

2. In a gear generating machine including a planing cutter and work holder, with depth feed mechanism and lateral feed mechanism therefor, an actuator for said depth feed mechanism, and means for causing said actuator to become periodically operative and inoperative, comprising a timing member provided with devices for placing and holding said actuator in an inoperative position, and causing the actuator to become again operative after a predetermined extent of movement of said timing member, and actuating mechanism for the timing member constructed and arranged to be operative when the depth feed actuator is inoperative.

3. In a gear generating machine including a planing cutter and work holder, with depth feed mechanism and lateral feed mechanism therefor, means for causing the cutter to make first a series of roughing cuts and then a series of finishing cuts in the work, comprising an actuator for the depth feed mechanism, a timing device for rendering the said actuator inoperative, mechanism for driving said timing device in synchronism with the lateral feed mechanism, the latter being formed with provisions for keeping the actuator inoperative until the roughing cuts are completed and then causing the actuator to become operative, and means controlled by the depth feed mechanism for again making the actuator inoperative.

4. A gear generating machine adapted to form the teeth of a gear automatically in a plurality of series of cuts, comprising a work holder, a planing cutter having a series of gear-shaped teeth, mechanism for producing a relative axial movement between the cutter and work holder to cause the former to move across the face of the work, depth-feed mechanism for moving the cutter and work holder relatively together to cause the teeth of the former to progressively enter the work, indexing mechanism for producing a simultaneous lateral feed movement of the cutter and work holder at right angles to both the above-named movements, whereby the forms of gear teeth are generated in the work, and means for interrupting the depth-feed mechanism during a cycle of the indexing mechanism, and subsequently causing it to become operative.

5. A gear-generating machine, comprising a cutter and a work-holder, one of which has a reciprocatory motion relatively to the other in a direction parallel to the axis thereof, depth-feed mechanism for progressively moving one toward the other, including an actuator, a timing member actuated first by said depth feed mechanism for disabling the actuator, indexing feed mechanism for laterally shifting the work-holder and cutter, and mechanism operated by said indexing mechanism for driving the timing member, the latter being constructed to hold the depth feed actuator out of operation for a period and subsequently cause it to become operative.

6. A gear-generating machine, comprising a cutter, a blank-holder, mechanism for reciprocating the cutter past the edge of the blank, depth and lateral feed mechanisms, a timing member, an actuator therefor operated by the lateral feed mechanism, and constructed to give a step-by-step progressive movement thereto, an actuator for the depth feed mechanism, and connections between said actuators for causing each in turn to become inoperative when the other is made operative.

7. A gear-generating machine, comprising a cutter, a blank-holder, mechanism for reciprocating the cutter past the edge of the blank, depth and lateral feed mechanisms, a timing member, an actuator therefor operated by the lateral feed mechanism, an actuator for the depth feed mechanism, said timing member being constructed and arranged to disconnect the depth feed actuator and subsequently render the same operative to cause a second actuation of the depth feed, and connections between said actuators arranged to throw one of them out of operation when the other is operating, and vice versa.

8. A gear-generating machine, comprising a cutter, a blank-holder, mechanism for reciprocating the cutter past the edge of the blank, depth and lateral feed mechanisms, a timing member, an actuator therefor operated by the lateral feed mechanism, an actuator for the depth feed mechanism, said timing member being constructed and arranged to disconnect the depth feed actuator and subsequently render the same operative to cause a second actuation of the depth feed, and devices operable by the depth feed for disconnecting and rendering inoperative said feed.

9. A gear-generating machine, comprising a gear-shaped cutter, a blank-holder, mechanism for reciprocating the cutter past the edge of the blank, depth and rotary feed mechanisms, a timing member, an actuator therefor operated by the rotary feed mechanism, an actuator for the depth feed mechanism, said timing member being constructed and arranged to disconnect the depth feed actuator and subsequently render the same operative to cause a second actuation of the depth feed, connections between said actuators arranged to throw one of them out of operation when the other is operating, and vice versa; and a tripping device for throwing out of operation the rotary feed.

10. In a generating machine of the character described, depth and lateral feed mechanisms, a timing member, actuators for said depth feed mechanism and timing member, respectively, and controlled by the timing member, whereby the depth feed actuator is disconnected and again connected for operation during one cycle of the machine, and connections operated by the depth feed mechanism for finally disconnecting the depth feed actuator.

11. In a generating machine of the character described, depth and lateral feed mechanisms, a timing member, actuators for said depth feed mechanism and timing member, respectively, and controlled by the timing member, whereby the depth feed actuator is disconnected and again connected for operation during one cycle of the machine, connections operated by the depth feed mechanism for again disconnecting the depth feed actuator, and a tripping device operated by the timing member for subsequently stopping the lateral feed mechanism.

12. In a generating machine of the character described, depth and rotary feed mechanisms, a timing member, actuators for said depth feed mechanism and timing member, respectively, and controlled by the timing member, whereby the depth feed actuator is disconnected and again connected for operation during one cycle of the machine, connections operated by the depth feed mechanism for again disconnecting the depth feed actuator, a tripping device operated by the timing member for subsequently stopping the rotary feed mechanism, and connections between said actuators whereby when one is disconnected the other is permitted to become operative.

13. In a machine of the character described, a depth feed screw and nut, a pawl and ratchet actuator for turning the same, a rotary feed for cutter and work, a timing disk, a pawl and ratchet actuator for rotating the disk operated by the rotary feed, provisions on the disk for disconnecting first one and then the other of the actuators, connections between said actuators for disconnecting one when the other is permitted to become operative, and means operated by said nut for disconnecting the actuator thereof.

14. In a machine of the character described, a depth feed screw and nut, a pawl and ratchet actuator for turning the same, a rotary feed for cutter and work, a timing disk, a pawl and ratchet actuator for rotating the disk operated by the rotary feed, provisions on the disk for disconnecting first one and then the other of the actuators, connections between said actuators for disconnecting one when the other is permitted to become operative, means operated by said nut for disconnecting the actuator thereof, and inter-engaging projections on the nut and disk, whereby the latter may be rotated by the former.

15. In a machine of the character described, a depth feed screw and nut, a pawl and ratchet actuator for turning the same, a rotary feed for cutter and work, a timing disk, a pawl and ratchet actuator for rotating the disk operated by the rotary feed, a tripping device to disconnect one of the pawls from, and permit the other to engage with its respective ratchet when moved in either direction, and connections operated by the timing disk for moving said tripping device.

16. In a machine of the character described, a depth feed screw and nut, a pawl and ratchet actuator for turning the same, a rotary feed for cutter and work, a timing disk, a pawl and ratchet actuator for rotating the disk operated by the rotary feed, a tripping device to disconnect one of the pawls from, and permit the other to engage with its respective ratchet when moved in either direction, connections operated by the timing disk for moving said tripping device, a locking member carried by the nut and adapted to enter a socket, and motion-transmitting connections arranged for operation by said locking member and adapted to engage and shift the tripping device.

17. In a machine of the character described, a depth feed screw and nut, a pawl and ratchet actuator for turning the same, a rotary feed for cutter and work, a timing disk, a pawl and ratchet actuator for rotating the disk operated by the rotary feed, a tripping device to disconnect one of the pawls from, and permit the other to engage with its respective ratchet when moved in either direction, connections operated by the timing disk for moving said tripping device, a locking bolt carried by the nut and adapted to enter a socket at the conclusion of the depth feed to hold the nut stationary, and a lever arranged for operation by said bolt and adapted to engage a portion of the tripping device and shift the same.

18. In a machine of the character described, a depth feed screw and nut, a pawl and ratchet actuator for turning the same, a rotary feed for cutter and work, a timing disk, a pawl and ratchet actuator for rotating the disk operated by the rotary feed, a tripping device to disconnect one of the pawls from, and permit the other to engage with its respective ratchet when moved in either direction, and connections operated by the timing disk for moving said tripping device, said connections consisting of an arm normally held against the disk, and a second arm connected thereto and in engagement with said tripping device.

19. In a machine of the character described, having a rotary cutter and work spindle and means for feeding the same relatively, a shaft for rotating the said means, driving means for said shaft consisting of pinions respectively loosely mounted and secured upon said shaft and a planetary gear in mesh with said pinions and independently driven, a stop for holding said loose pinion stationary, whereby the shaft is caused to turn, a timing disk rotarily driven, and a device operated by said timing disk at the conclusion of the cutting operation for tripping said stop to release the loose pinion.

20. In a machine of the character described, having a rotary cutter and work spindle, a shaft for rotating the same, driving means for said shaft consisting of tight and loose pinions and a planetary gear, a stop for holding said loose pinion stationary, whereby the shaft is caused to turn, a sound-producing device engaged and held inoperative by said stop, a timing disk rotarily driven, and a device operated by said timing disk at the conclusion of the cutting operation for tripping said stop to release the loose pinion, and to permit said sound-producing device to become operative.

21. In a machine of the character described, having a rotary cutter and work spindle, a shaft for rotating the same, driving means for said shaft consisting of tight and loose pinions and a planetary gear; a bell mounted on a holder connected with said loose pinion and movable to carry the bell toward and away from the shaft, a striker movable with the planetary gear, means tending to move the bell into the path of the striker, and a stop arranged to engage the bell holder and retain the bell out of the path of the striker, thereby at the same time holding the loose pinion from rotation.

22. In a machine of the character described, having a rotary cutter and work spindle, a shaft for rotating the same, driving means for said shaft consisting of tight and loose pinions and a planetary gear, a bell mounted on a holder connected with said loose pinion and movable to carry the bell toward and away from the shaft, a striker movable with the planetary gear, means tending to move the bell into the path of the striker, a stop arranged to engage the bell holder and retain the bell out of the path of the striker, thereby at the same time holding the loose pinion from rotation, whereby the shaft is caused to turn, a timing disk rotated by the rotary feed, and a device operated by said timing disk at the conclusion of the cutting operation for tripping said stop to release the bell holder.

23. In a machine of the character described, having a rotary cutter and work spindle, a shaft for rotating the same, driving means for said shaft consisting of tight and loose pinions and a planetary gear, a bell mounted on a holder connected with said loose pinion and movable to carry the bell toward and away from the shaft, a striker movable with the planetary gear, means tending to move the bell into the path of the striker, a stop arranged to engage the bell holder and retain the bell out of the path of the striker, thereby at the same time holding the loose pinion from rotation, whereby the shaft is caused to turn, a trip for holding the stop in contact with the bell holder, a timing disk operated by the rotary feed, and a device carried by said disk for moving said trip at the conclusion of the cutting operation to release the stop and permit the same to move out of engagement with the bell holder.

24. In a machine of the character described, a depth feed screw and nut, means for rotating said nut, a timing disk, means for rotating said disk, connections between said rotating means and under the control of said disk whereby one is made inoperative while the other is operative, and provisions carried by the nut for moving the disk to cause actuation of said connections.

25. In a machine of the character described, a depth feed screw and nut, means for rotating said nut, a timing disk, means for rotating said disk, connections between said rotating means and under the control of said disk whereby one is made inoperative while the other is operative, and projections carried by the disk and nut arranged to engage during the rotation of the latter to move the disk and cause actuation of said connections.

26. In a machine of the character described, a depth feed screw and nut, means for rotating said nut, a timing disk, means for rotating said disk, connections between said rotating means and under the control of said disk whereby one is made inoperative while the other is operative, a dog carried by the disk, and a spring pin carried by the nut arranged to engage the dog during rotation of the nut to move the disk and thereby cause actuation of said connections.

27. In a machine of the character described, a depth feed screw and nut, an actuator for rotating said nut, a timing disk, an actuator for rotating said disk, connections between said actuators arranged to render one of them inoperative whenever the other becomes operative, yielding means tending to retain said actuators in one relation, yielding means carried by the disk for moving them into another relation, and positive holding means on the disk for retaining them in such second relation during part of the rotation of said disk.

28. A gear-generating machine comprising a cutter, a workholder, mechanism for feeding one toward the other, mechanism for producing relative lateral movement between the cutter and workholder, whereby to produce a series of grooves upon the periphery of the work, and automatic means operated by the first feeding mechanism for disabling the same at the conclusion of such feeding movement, while permitting the lateral feed to continue, said means being actuated by the lateral feed mechanism to subsequently cause the first feeding mechanism to become operative.

29. A gear-generating machine comprising a cutter, a workholder, depth feed mechanism for moving one toward the other, lateral feed mechanism for relatively moving the cutter and workholder to cause formation of a series of peripheral grooves on the work, a feed-controlling member adapted to be operated by the lateral feed mechanism when the depth feed is disabled, means operated by the depth feed mechanism at the conclusion of such feed for disabling the same, and means operated by said controlling member for arresting the lateral feed upon completion of the work.

30. A gear-generating machine comprising a cutter, a workholder, depth feed mechanism for moving one toward the other, lateral feed mechanism for relatively moving the cutter and workholder to cause formation of a series of peripheral grooves on the work, a feed-controlling member adapted to be operated by the lateral feed mechanism when the depth feed is disabled, means operated by the depth feed mechanism at the conclusion of such feed for disabling the same, and a displaceable device carried by said depth feed mechanism adapted to be placed so as to arrest such mechanism and cause operation of said controlling member prior to the operation of said disabling means, said controlling member having provisions for again causing actuation of the depth feed mechanism and for stopping the lateral feed after completion of a gear.

31. A gear-generating machine comprising a cutter, a workholder, depth feed mechanism for moving one toward the other, lateral feed mechanism for relatively moving the cutter and workholder to cause formation of a series of peripheral grooves on the work, a feed-controlling member adapted to be operated by the lateral feed mechanism when the depth feed is disabled, means operated by the depth feed mechanism at the conclusion of such feed for disabling the same, a projection carried by the depth feed mechanism adapted to engage said controlling member and set the same in operation to arrest the depth feed prior to the actuation of said disabling means, said projection being capable of displacement so as to pass the controlling member without engagement, and provisions on the controlling member for again setting in operation the depth feed mechanism at the conclusion of a roughing cut.

32. In a gear cutting machine having means for indexing the cutter and work progressively, and continuously during the cutting operations, depth feed mechanism for moving the cutter and work relatively together, means for arresting said depth feed much before the cutting has proceeded to the depth required in the finished work, during a period sufficient to permit the indexing mechanism to complete a cycle of operations, whereby a roughing series of cuts may be taken before completion of the work, and means for rendering said arresting means inoperative.

33. In a gear cutting machine having means for indexing the cutter and work progressively and continuously during the cutting operations, depth feed mechanism for moving the cutter and work relatively together, a timing member constructed to interrupt and arrest the depth feed mechanism before completion of the depth feed, for a period sufficient to permit a complete series of roughing cuts to be made, and means arranged to be made operative or inoperative at will for setting said timing member in action.

34. In a gear cutting machine having means for indexing the cutter and work progressively and continuously during the cutting operations, depth feed mechanism for moving the cutter and work together, means arranged for operation in the first instance by the depth feed mechanism for rendering said mechanism inoperative, to interrupt the depth feed before completion thereof, and mechanism operated by the indexing means for causing said last named means to permit renewed operation of the depth feed mechanism, and continuance of such depth feed.

35. In a gear-cutting machine, feeding means for bringing the cutter and work together, indexing means for presenting different parts of the work to the cutter, a timing member having provisions for causing arrest of the feeding means and having a device for stopping the indexing means upon completion of the work, a device carried by part of the feeding means capable of being projected so as to engage the timing member and move the latter, whereby the feeding means is arrested, an actuator for the timing member, provisions governed by the timing member for throwing out said actuator and starting the feeding means, and connections operated by said feeding means for disabling the same at the conclusion of the feed and for starting the timing means; the aforesaid device being capable of an inoperative placing whereby the intermediate operation of the timing member may be avoided.

36. In a gear-cutting machine, feeding and indexing mechanism, a timing member for governing the operation of said mechanism, driving mechanism therefor, a projection carried by the feeding mechanism adapted to be variously placed so as to pass by or engage and operate the timing member to produce one or a plurality of indexings of the work in a single cycle of operations, and devices for varying the speed at which said driving mechanism actuates the timing member, according as the work is indexed once or a plurality of times.

37. In a gear-cutting machine, feeding and indexing mechanism, a timing member, a ratchet for operating the same, a pawl for operating the ratchet, a carrier for advancing and retracting the pawl, and a stop movable into the path of said pawl carrier to limit the movement thereof and thereby the rate of speed of the timing member.

38. In a gear-cutting machine, cutter-feeding and blank-indexing mechanism, a timing member, an actuator for the cutter-feeding mechanism, devices on the timing member for causing disconnection of the indexing member upon completion of the work, and retaining the cutter feed actuator out of operation at the same time, and a starting lever arranged for engagement with the timing member and adapted to be manually operated to move the latter sufficiently to release the cutter-feed actuator and permit the same to become active.

In testimony whereof I have affixed my signature, in presence of two witnesses.

EDWIN R. FELLOWS.

Witnesses:
C. F. BROWN,
ARTHUR H. BROWN.